8920X
J. Catling.
Cotton Planter.
No. Patented Jan. 20, 1836.
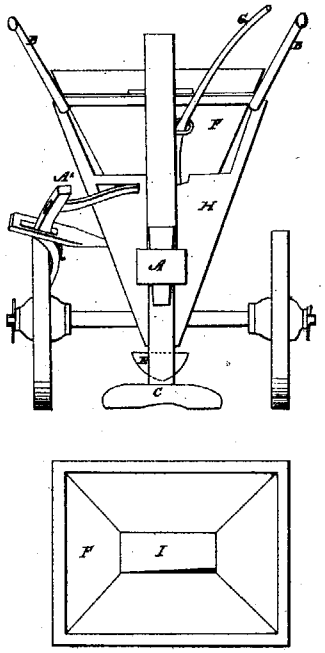
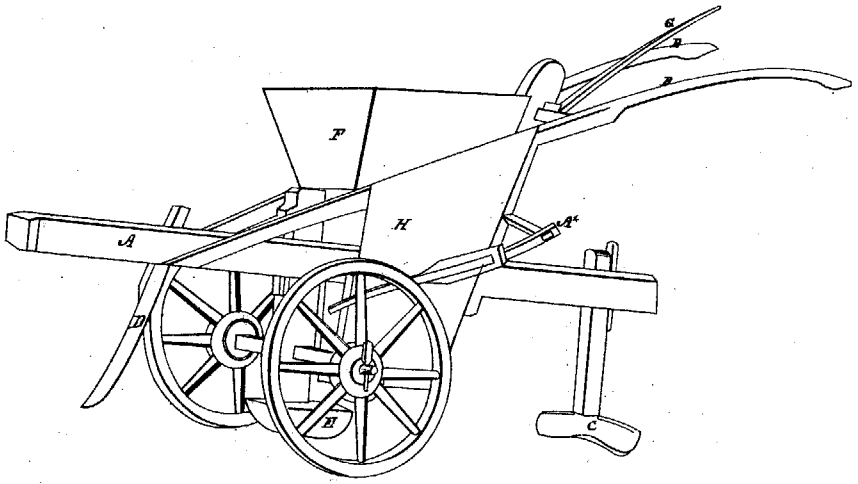
N. PETERS, PHOTO-LITHOGRAPHER, WASHINGTON, D. C.

June 20 1835 6920X 27

Jordan Gatling Murfreesborough North Carolina

Letters Patent

The schedule referred to in these Letters Patent and making part of the same contain-ing a description in the words of the said Jordan Gatling himself of his improvement in the Cotton Planter.

To all to whom these presents shall come Be it known that I Jordan Gatling of Mur-freesborough in the County of Hertford and State of North Carolina have invented a new and useful improvement in the Cotton Planter and that the following is a full and ex-act description of the construction and operation of the said Machine as invented or im-proved by me. Having made several experiments in order to facilitate the operation of sowing cotton seed by some method which in employing horse or animal power would obviate the general difficulty presented by the disposition the seeds shew to adhere together by the [illegible] attached to them I have at length adopted the following mode of distributing them which has been found fully to answer the purpose and may be adapted to the [illegible] [illegible] of ploughs intended to seed cotton with them.

The beam of the plough which is straight has the handles fastened to the side in some where near the centre of the length & rising as they advance backwards are kept at the proper distance apart by means of a brace which passes through the top of an upright mortised into the back of the beam.

Beneath this upright the [illegible] is lo-cated at such a distance below as will accord with that of the Coulter placed in front & immediately behind this said Coulter is placed the opener which consists of a perpen-dicular [illegible] from the beam into which it is secured by a suitable tenon & hav-ing at the bottom a rectangular projection towards the front leaving somewhat the shape of the [illegible] of a boat the bed to open the trench an axle is passed through the perpendicular just above the rectangular projection across the ridge and of such length as to reach on either side of it having on its ends two wheels intended to regulate the depth of the opener. This is to be used where the ridge or bed is already formed. It is only to be used to open the trench & [illegible] the seed, but this perpendicular with its appendages may be removed if desired and a hoe substituted for it where no bed is required &

8920X the trench opened & sown as usual. In order to distribute the seed I construct the
following apparatus consisting of a hopper over or on top of & between the handles
just behind the opener & which is there secured to the handles the shape will be
best adapted by using an oblong following the length of the beam.

To the bottom of the four sides (which are gradually
to approach each other as they descend) is to be fitted a shutter or slide board, so as to
close up the opening when desired either entirely (as when in turning or on spots
not to be sown) or in part so as to let out but a given portion of seed such as may be
requisite to the sowing. The motion to be given to this slide board is produced by the
following arrangement; a broad piece of leather (which I find to answer as well as any
thing else) is fastened to the bottom of the front side of the hopper so as to allow the
board to shake from side to side, and on the opposite or back side of the hopper
another piece of leather is attached to the under side of the slide board or a pin is pass
ed through it & the end of a long lever or handle consisting of a slender shaft sufficiently
long to reach to the end of the plough handles so as to be grasped at the same time there
-with when desired. This shaft is supported beneath the brace which keeps the handles
apart by means of a staple or eye secured there and in which it plays from side to side.

Beneath this first hopper intended to
contain the seed is placed another enclosing the lower part of it & descending by a gradual
diminution of its width so as to leave below the beam, where the sides approach the near
-est a long narrow opening of about ten or eleven inches in length and about one in breadth
through which the seed passes into the trench previously opened by the hoe or opener &
a corresponding hole made through the beam by shaking this shaft handle or moving it
from side to side as the plough advances the staple forming the fulcrum regulates the
distance to which the slide board can move from side to side, the pin through it and
the end of the shaft serving as a pivot and the leather hinge being sufficiently elastic
to admit of the same motion. In this manner a long triangular opening is formed at each
shake or movement of the shaft and slide board on say the left hand side (as being
the most handy) during the progress of the plough and should it be desired in turning
or on other occasions the opening may be effectually closed so as to prevent the passage
of the seed by pressing the shaft to the plough handle of the opposite side to the triangular
opening & retaining it there by the grasp of the hand around both until the sowing
is to recommence. What I claim as my invention and not previously known 8920X 339 in the above described machine is not the arrangement of the whole machine but only that part of it which performs the operation of distributing the portions of seed intended to be let fall from the first hopper to the second one, and consisting of the combination formed by the slide board attached as described to the hopper and moved from side to side by the [illegible] suspended from the beam by the eye & working with the slide board by means of the [illegible] pins. Also the use of the second hopper below, adjusted with the hole through the beam.

These parts being combined upon the principle of regulating the seeding by the hand at pleasure so as to distribute more or less or to [illegible] the passage altogether as desired. In testimony that the above is a full and clear description of the construction and principles adopted in the mode of operation I have hereunto set my hand this twenty fifth day of May Eighteen hundred and thirty five Witnesses
C. H. W. Wharton
Henry Stone

[illegible] Gatling

Drawing
Drawing 1168 words

[illegible]